June 8, 1971  A. VIAN-ORTUNO ET AL  3,583,077
APPARATUS FOR THE INTRODUCTION AND DIRECTIONAL DISTRIBUTION
OF FLUIDIZING GAS INTO FLUIDIZATION BEDS
Filed April 2, 1969  2 Sheets-Sheet 2

United States Patent Office 3,583,077
Patented June 8, 1971

3,583,077
APPARATUS FOR THE INTRODUCTION AND DIRECTIONAL DISTRIBUTION OF FLUIDIZING GAS INTO FLUIDIZATION BEDS
Angel Vian Ortuno and Vincente Martin Municio, Madrid, Spain, assignors to Empresa Auxiliar de la Industria S.A., Madrid, Spain
Filed Apr. 2, 1969, Ser. No. 812,654
Claims priority, application Spain, Apr. 5, 1968, 352,429
Int. Cl. F26b 3/08
U.S. Cl. 34—10
12 Claims

ABSTRACT OF THE DISCLOSURE

Apparatus for the introduction and directional distribution of fluidizing gas into fluidization beds containing particulate material of heterogeneous grain size comprising a series of gas inlet nozzles constructed to direct gas flow in a predetermined direction by means of directionally oriented orifices. The nozzles are mounted in the bed plate in a geometric pattern to accomplish a maximum effective gas flow through the material without disturbing finer grains, but causes the larger grains to move through the fluidization bed.

CROSS-REFERENCE TO RELATED APPLICATION

The apparatus of the present invention constitutes an improvement over the apparatus disclosed in the copending application Ser. No. 622,018 filed Mar. 2, 1967.

BACKGROUND OF THE INVENTION

The present invention relates to an apparatus for the fluidization of particulate material in a fluidization bed. Fluidization beds are often used to introduce gases into a solid particulate material composed of heterogeneous grain sizes. The granular material is fed from a suitable source into a fluidizing tunnel bed having a length which is not less than 3 times the width and wherein the height to width ratio is dependent upon the grain size of processed material. The material is fed through an inlet onto a perforated bed plate where it accumulates in layers through which the fluidizing gas is introduced and the thus fluidized material is moved to an outlet.

Experimentation with the distribution of the granular particles in layers has shown that when heterogeneous grains within a large size variation are used, the velocity of the fluidizing gas (cubic meters of gas for each square meter of the layer per hour) must be maintained at a relatively low level in order to avoid dragging the fine particles out of the layer bed. Also, some of the larger particles may not be fluidized and will settle on the surface of the plate and thereby tend to reduce the effective area of the bed plate by blocking the gas admitting apertures.

SUMMARY OF THE INVENTION

It is an object of this invention to provide a novel means for the fluidization of particulate material in a fluidization bed.

Another object of this invention is to provide a novel method fluidizing particulate material which contains particles of different size without undesirable segregation of larger particles from smaller particles.

Another object of this invention is to improve upon presently known apparatus used for the fluidization of solid particulate material, with particular emphasis upon predictably controlling the evacuation of the material from the fluidizing area.

The method of this invention comprises the steps of establishing a bed of particulate material, introducing into the bed first streams of gaseous fluid in a first direction to fluidize at least a substantial portion of the material, and introducing second streams of gaseous fluid in a second direction into the bed so that the fluidized material is set in motion in a predetermined direction.

The novel features which are considered as characteristic of the invention are set forth in particular in the appended claims. The apparatus itself however, both as to its construction and its method of operation, together with additional features and advantages thereof, will be best understood from the following description of specific embodiments when read in connection with the accompanying drawings.

DESCRIPTION OF THE PREFERRED EMBODIMENTS

Figure 1:
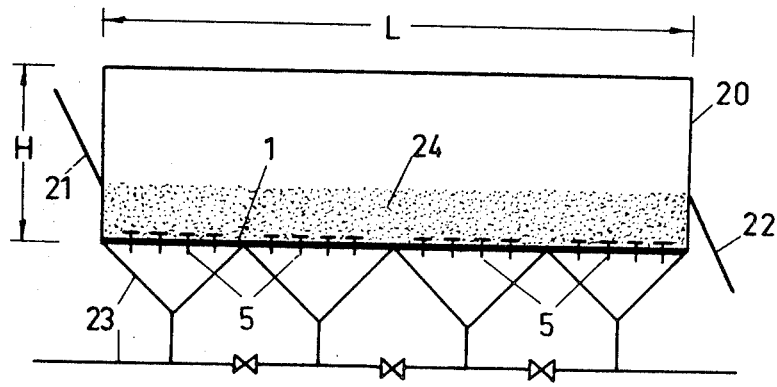
FIG. 1 is a schematic longitudinal sectional view of a representative construction of a fluidizing tunnel bed.

FIG. 1 is a schematic representation of one form of construction of a fluidization tunnel bed 20 of height H and length L. The particulate material is fed into the bed at an inlet or charging point 21 to form a layer bed 24 of particulate material and is discharged at an outlet or discharge point 22. The fluidizing gas is introduced into the layer bed 24 by means of gas inlet system 23 connected to nozzles 5 which are mounted in fluidizing bed plate 1 in a geometric pattern.

Figure 2:
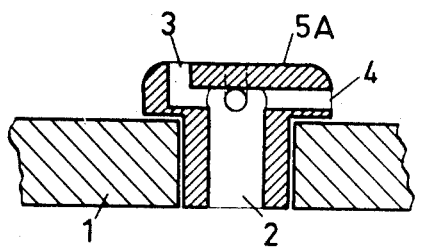
FIG. 2 is an enlarged cross-sectional view of a fluidizing bed plate and one embodiment of a gas inlet nozzle supported therein.
Figure 2A:
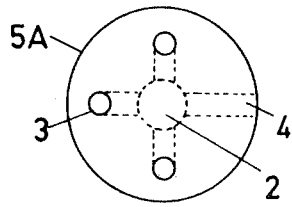
FIG. 2a is a plan view of the nozzle shown in FIG. 2.

FIG. 2 is an enlarged cross-sectional view of a portion of bed plate 1 showing one embodiment of the gas inlet nozzle 5A mounted therein. Nozzle 5A is provided with a principal inlet duct 2 which branches (see also FIG. 2a) into three vertical outlet orifices 3 and a horizontal outlet orifice 4. Thus part of the gas flow will be directed upward into the layer bed 24 and the other part will enter into the material parallel to the surface of bed plate 1. In this way such groups of granular particles which are not fluidized by the gas stream from orifices 3 will be fluidized by the gas stream discharged through orifice 4 and will be moved toward the discharge end of tunnel bed 20. FIG. 2a shows the nozzle 5A in plan view.

Figure 3:
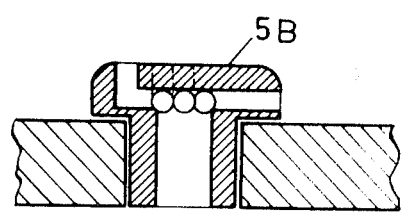
FIG. 3 is an enlarged cross-sectional view of the fluidizing bed plate and an alternative embodiment of the gas inlet nozzle.
Figure 3A:
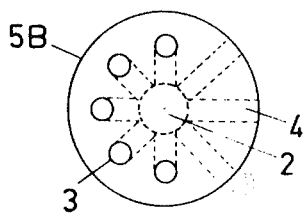
FIG. 3a is a plan view of the nozzle shown in FIG. 3.

FIG. 3 is an enlarged cross-sectional view of an alternative embodiment 5B of the gas inlet nozzle. FIG. 3a is a plan view of nozzle 5B. Nozzle 5B differs from the first embodiment in that there are a greater number of vertical orifices 3 and horizontal orifices 4, i.e., five vertical and three horizontal orifices respectively (see FIG. 3a). It should be noted that it is not the number of horizontal orifices but rather their orientation and cross-sectional area which is important to ensure that there will be sufficient force in the gas streams discharged from them to cause a circulation of the large grains which tend to gather in inactive flow areas of the bed plate.

Figure 4:
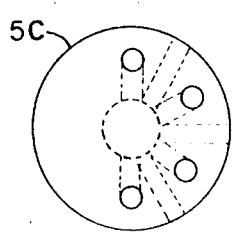
FIG. 4 is an enlarged plan view of a third embodiment of the gas inlet nozzle.

FIG. 4 is a plan view of still another alternative embodiment 5C of the gas inlet nozzle. This embodiment has the outlet orifices arranged in alternate succession so that a horizontal orifice is flanked by two vertical orifices or vice versa.

The orifices are arranged in a 180° pattern which faces the discharge point so that the horizontal orifices which are not parallel to the gas stream at least provide a component of flow in the discharge direction.

If no particular direction of gas flow is desired it is possible to further enhance fluidization by arranging the vertical and horizontal orifices in alternative succession as described above, but in the form of a 360° pattern rather than a 180° pattern.

Figure 5:
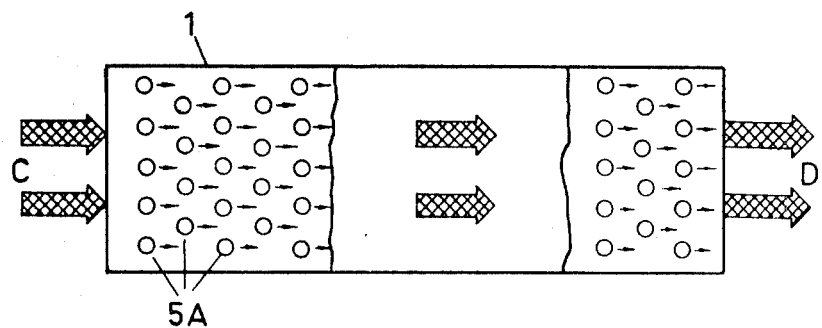
FIG. 5 is a schematic partial cross-sectional plan view of a fluidizing bed plate showing the geometrical arrangement of the gas inlet nozzles.

FIG. 5 is a schematic partial cross-sectional plan view of fluidizing bed plate 1. Nozzles 5A are arranged in any suitable pattern, preferably a geometric pattern which causes a maximum effective gas flow that will displace the larger grains from charging point C to discharge point D without accumulating in the bed. The smaller arrows designate the direction of the gas streams leaving the horizontal orifices 4 of each nozzle and the larger arrows indicate the resultant flow obtained from all of the horizontal orifices.

In order that pressure losses or inefficient fluid distribution or occlusion of the orifices may be avoided, it may be desirable to have each of the cross-sectional areas of the horizontal orifices 4 equal to the others and the sum of these cross-sectional areas equal to the cross-sectional area of the principal inlet duct 2. To account for varying fluidization characteristics of different types of solids it may also be necessary to provide the bed plate with larger or smaller horizontal orifices so that the sum of their respective cross-sectional areas may be less than or greater than the cross-sectional area of the principal inlet duct 2.

Figure 6:
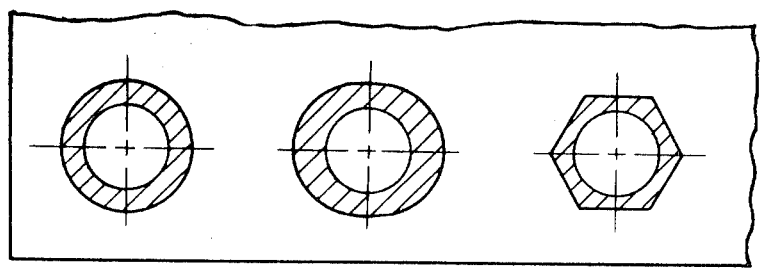
FIG. 6 is a partial plan and partial cross-sectional view of a bed plate with three nozzles of different circumferential outlines mounted therein.

FIG. 6 is a partial plan and partial cross-sectional view of a bed plate with three nozzles of different circumferential outline mounted therein. The shape which is preferable is that one which best restricts any movement of the nozzle caused by the gas flow. It is also possible to eliminate the nozzles entirely by substituting a series of projections formed on the active surface of bed plate 1 and forming the inlet duct 2 and the orifices 3 and 4 therein.

Without further analysis, the foregoing will so fully reveal the gist of the present invention that others can, by applying current knowledge, readily adapt it for various applications without omitting features which fairly constitute essential characteristics of the generic and specific aspects of the above-mentioned contribution to the art.

What is claimed as new and desired to be protected by Letters Patent is set forth in the appended claims:

1. A method of fluidizing and transporting particulate material comprising the steps of establishing a bed of particulate material, introducing into said bed first streams of gaseous fluid in a first direction to fluidize at least a substantial portion of said material, and introducing into said bed second streams of gaseous fluid in a second direction transverse to said first direction to set the fluidized material in motion in a predetermined direction.

2. In a fluidizing apparatus, a receptacle for a supply of particulate material consisting of particles of different size, said receptacle having a planar bottom wall provided with first and second orifices, said receptacle further comprising an inlet for admission of particulate material and an outlet for the evacuation of particulate material, said first orifices being arranged to discharge a gaseous fluid substantially parallel to said bottom wall and in the general direction toward said outlet so as to expedite movement of said particles toward said outlet and to prevent particles from remaining stationarily on said bottom wall, and said second orifices being arranged to discharge a gaseous fluid in a direction substantially normal to said bottom wall so as to effect fluidizing of said material, and means for supplying fluid to said first and second orifices.

3. An apparatus as defined in claim 2, wherein said planar bottom wall extends substantially horizontally and is provided with a plurality of apertures therethrough, and including a plurality of nozzles each having a first portion fitted in a respective aperture and provided with a duct therethrough and a second portion above the top face of said bottom wall, said orifices being formed in said second portion and communicating with said duct, each of said nozzles having at least one of said first orifices extending substantially horizontally toward said outlet and at least one of said second orifices extending substantially normal to said top face.

4. An apparatus as defined in claim 3, wherein each of said nozzles has a plurality of said second orifices circumferentially spaced from each other.

5. An apparatus as defined in claim 4, wherein each of said nozzles has a plurality of said first orifices which extend angularly displaced from each other and radially outwardly from said duct toward the side of said nozzle which faces said outlet.

6. An apparatus as defined in claim 3, wherein the number and the combined cross sections of said first orifices in each nozzle is smaller than the number and the combined cross sections of said second orifices therein.

7. An apparatus as defined in claim 6, wherein said first orifices in each nozzle alternate in circumferential direction with said second orifices.

8. An apparatus as defined in claim 2 wherein all of said first orifices are oriented in the same direction toward said outlet.

9. An apparatus as defined in claim 2, wherein said means for supplying fluid to said first and second orifices comprises inlet ducts.

10. An apparatus as defined in claim 9, wherein the combined cross-sectional areas of said orifices at least approximates the cross-sectional area of said ducts.

11. An apparatus as defined in claim 9, wherein the combined cross-sectional area of said orifices is different from the combined cross-sectional areas of the ducts.

12. An apparatus as defined in claim 3, wherein said first portions of at least some of said nozzles and the corresponding apertures are of other than circular outline.

References Cited

UNITED STATES PATENTS

| | | | |
|---|---|---|---|
| 2,288,613 | 7/1942 | Dill | 34—10UX |
| 2,378,157 | 6/1945 | Ramseyer et al. | 34—57A |
| 2,419,245 | 4/1947 | Arveson | 34—57A.X |
| 2,702,742 | 2/1955 | Hillard, Jr. | 34—57A.X |
| 3,484,948 | 12/1969 | Whelan | 34—57C |

FREDERICK L. MATTESON, Primary Examiner

R. A. DUA, Assistant Examiner